(No Model.)
T. TERRELL.
MAKING FERRIC OXIDE AND SULPHUROUS ACID FROM FERRIC SULPHATE.
No. 308,289. Patented Nov. 18, 1884.
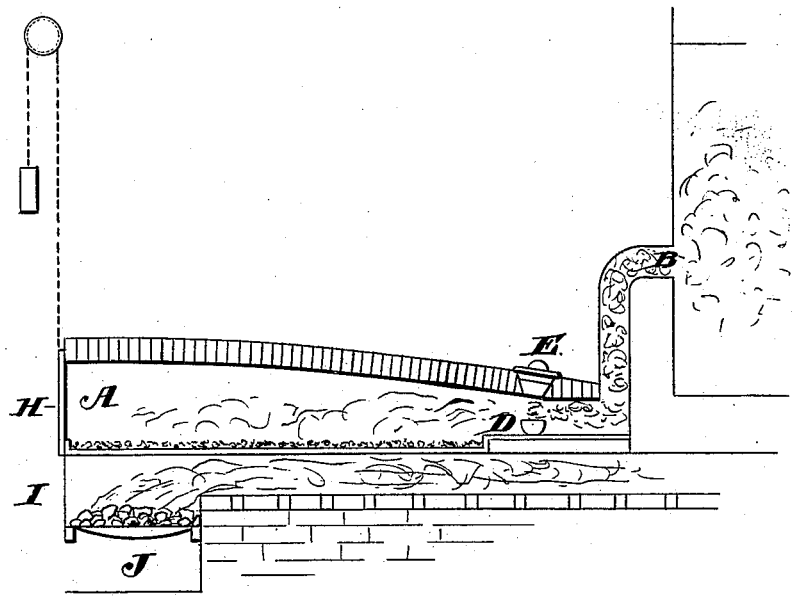
Witnesses.
Robert Everett,
Dennis Sumby.
Inventor.
Thomas Terrell,
By James L. Norris,
Atty.

UNITED STATES PATENT OFFICE.

THOMAS TERRELL, OF LONDON, ENGLAND.

MAKING FERRIC OXIDE AND SULPHUROUS ACID FROM FERRIC SULPHATE.

SPECIFICATION forming part of Letters Patent No. 308,289, dated November 18, 1884.

Application filed June 24, 1884. (No model.) Patented in England April 4, 1884, No. 5,930.

*To all whom it may concern:*

Be it known that I, THOMAS TERRELL, of London, England, barrister-at-law, have invented certain new and useful Improvements in Decomposing Sulphate of Iron and in the Obtaining Sulphurous Acid and Red Oxide of Iron thereby, of which the following is a specification, reference being had to the accompanying drawing.

Sulphate of iron, commonly known as "green copperas," has hitherto been submitted to destructive distillation, and the result has been that the sulphuric acid present has been partly decomposed, a portion passing off as sulphurous acid and a portion as fuming sulphuric acid, the residue in the furnace or retort being red oxide of iron. This process of destructive distillation is very costly by reason of the difficulty experienced in driving off the heavy fumes of the sulphuric acid, it being necessary to maintain the sulphate of iron for many hours at a temperature bordering upon a white-heat, and even then it frequently happens that the oxide of iron, when withdrawn from the retort or furnace, contains large quantities of undecomposed sulphate of iron and of free sulphuric acid.

My invention consists in mixing the sulphate of iron with free sulphur in the proportion of about one part of free sulphur to ten parts of hydrated sulphate of iron or crystal copperas. I use the sulphur in the condition either of sublimed sulphur or as ground brimstone. I throw the mixture either upon a drying-floor of cast-iron or tiles or into a cast-iron pan, and by the aid of fire drive off the water of crystallization, and by constant stirring while the drying process is proceeding I reduce the mixture to a pulverulent dry mass. I then place this dry substance in the form of powder into a furnace constructed, by preference, upon the plan of a burner, similar to those commonly used for converting sulphur into sulphurous acid for the purpose of manufacturing sulphuric acid, with this exception, that under the floor of the burner I place a furnace capable of rendering the floor of the burner red-hot, as shown in the accompanying drawing. At the farther end of the furnace I have a cast-iron flue, leading into an ordinary vitriol-chamber. In this flue I have a door to which access can be obtained, and in the flue I place the niter-pots necessary to convert the sulphurous acid into sulphuric acid. The fumes of sulphurous acid are converted into sulphuric acid in the ordinary way. I first place a fire in the furnace under the floor of the burner, and having heated the said floor to a dull-red heat I throw in the dry powder above described. So soon as the heat has penetrated, which, as a rule, takes from five minutes to twenty minutes, the excess of sulphur burns out, forming sulphurous acid, which passes into the chamber. The remaining sulphur reduces the sulphuric acid in the sulphate of iron to sulphurous acid, and in this condition a rapid decomposition takes place, and before the whole mass has become red-hot the whole of the sulphuric acid in the sulphate of iron passes off into the chamber as sulphurous acid, leaving behind oxide of iron in a brilliant-red form, which is valuable as a pigment. The oxide of iron may be drawn out in from an hour to an hour and a-half, according to the temperature attained, or so soon as fumes of sulphurous acid are no longer emitted.

The accompanying drawing is a longitudinal section of a furnace and parts connected therewith constructed and arranged as hereinbefore described. A is the furnace or burning-chamber; B, the flue thereof. C is the floor for supporting the dry powdered mixture of sulphate of iron and sulphur. D is a niter-pot; E, an opening for inserting the same. H and I are respectively the doors of the burning-chamber and the furnace, and J is the ash-pit.

What I claim is—

The process of making red oxide of iron and sulphurous acid by decomposing ferric sulphate by heat, assisting decomposition of the latter by mixing therewith a portion of sulphur, substantially as specified.

THOMAS TERRELL.

Witnesses:
 GEO. S. VAUGHAN,
 C. WALL,
  *Both of 57 Chancery Lane, London.*